(12) United States Patent
Søraas et al.

(10) Patent No.: US 9,285,055 B2
(45) Date of Patent: Mar. 15, 2016

(54) SELF LOCK MECHANISM FOR VALVE ACTUATOR

(75) Inventors: Terje Søraas, Vanvikan (NO); Jon Eirik Brennvall, Trondheim (NO); Tor Erik Naebb, Leksvik (NO)

(73) Assignee: ELTORQUE AS, Vanvikan (NO)

( * ) Notice: Subject to any disclaimer, the term of this patent is extended or adjusted under 35 U.S.C. 154(b) by 12 days.

(21) Appl. No.: 13/810,369

(22) PCT Filed: Jul. 14, 2011

(86) PCT No.: PCT/NO2011/000204
§ 371 (c)(1),
(2), (4) Date: Feb. 14, 2013

(87) PCT Pub. No.: WO2012/008851
PCT Pub. Date: Jan. 19, 2012

(65) Prior Publication Data
US 2013/0139908 A1 Jun. 6, 2013

(30) Foreign Application Priority Data
Jul. 16, 2010 (NO) .................................. 20101022

(51) Int. Cl.
*F16K 35/00* (2006.01)
*F16D 41/064* (2006.01)

(52) U.S. Cl.
CPC .............. *F16K 35/00* (2013.01); *F16D 41/064* (2013.01); *Y10T 137/7256* (2015.04)

(58) Field of Classification Search
CPC ................................ F16K 35/00; F16D 41/064

USPC .............. 251/89, 90, 92, 93, 101; 192/54.52, 192/223.2, 38, 44
See application file for complete search history.

(56) References Cited

U.S. PATENT DOCUMENTS

| 360,393 | A | * | 3/1887 | Roger | 192/45.005 |
| 1,285,153 | A | * | 11/1918 | Hauser | 192/223.2 |
| 2,209,122 | A | * | 7/1940 | Houplain | 192/223.2 |
| 2,453,794 | A | * | 11/1948 | Iavelli | 74/333 |

(Continued)

FOREIGN PATENT DOCUMENTS

| CN | 2823661 Y | 10/2006 |
| CN | 101184932 A | 5/2008 |

(Continued)

OTHER PUBLICATIONS

Norwegian Search Report dated Feb. 16, 2011 issued in connection with Application No. 20101022.

(Continued)

*Primary Examiner* — John K Fristoe, Jr.
*Assistant Examiner* — Umashankar Venkatesan
(74) *Attorney, Agent, or Firm* — Foley & Lardner LLP (57) ABSTRACT

A self lock mechanism for rotating actuators, which allow rotation from one side while deny rotation from the other side, comprising sets of rollers arranged between a housing and a valve connection part, configured with a special shape to cause locking if the mechanism is attempted twisted from the valve side, a motor connection part to press rollers out of locking position and release the locking before the motor connection part makes contact with the valve connection part and start transferring torque. The rollers may be separated and kept in place by a wing on the valve connection part or by springs.

2 Claims, 6 Drawing Sheets

(56) References Cited

U.S. PATENT DOCUMENTS

| | | | |
|---|---|---|---|
| 2,827,991 A * | 3/1958 | Bradway | 192/45.006 |
| 3,134,471 A * | 5/1964 | Croswhite | 192/44 |
| 3,243,023 A * | 3/1966 | Boyden | 192/223.2 |
| 4,220,230 A | 9/1980 | Hansen | |
| 4,294,340 A | 10/1981 | Kunze | |
| 4,746,320 A | 5/1988 | Kilwin | |
| 4,838,829 A | 6/1989 | Maurer et al. | |
| 5,145,042 A | 9/1992 | MacPherson | |
| 5,383,542 A | 1/1995 | Stockton | |
| 5,386,231 A | 1/1995 | Shimizu et al. | |
| 5,672,110 A | 9/1997 | Kurita et al. | |
| 5,868,231 A | 2/1999 | Kampf | |
| 6,000,512 A * | 12/1999 | Cronin et al. | 192/38 |
| 6,055,888 A * | 5/2000 | Mitchell | 81/59.1 |
| 6,276,845 B1 * | 8/2001 | Terada et al. | 396/413 |
| 6,516,929 B1 * | 2/2003 | Baniak et al. | 192/38 |
| 6,672,442 B2 | 1/2004 | Kato et al. | |
| 7,673,731 B2 * | 3/2010 | Murata | 192/223.2 |
| 7,832,542 B2 * | 11/2010 | Byun | 192/223.2 |
| 2002/0125099 A1 * | 9/2002 | Kurita et al. | 192/223.2 |
| 2006/0278494 A1 * | 12/2006 | Itomi | 192/223.2 |
| 2008/0179156 A1 | 7/2008 | Byun | |
| 2009/0205596 A1 | 8/2009 | Kanda | |

FOREIGN PATENT DOCUMENTS

| | | |
|---|---|---|
| GB | 2 133 093 | 7/1984 |
| JP | 2008-032036 | 2/2008 |

OTHER PUBLICATIONS

International Search Report dated Oct. 10, 2011 issued in connection with PCT/NO2011/000204.

Written Opinion of the International Searching Authority dated Oct. 10, 2011 issued in connection with PCT/NO2011/000204.

* cited by examiner

SELF LOCK MECHANISM FOR VALVE ACTUATOR

CROSS REFERENCE TO RELATED APPLICATIONS

The present application is a National Stage of International Application No. PCT/NO2011/000204 filed on Jul. 14, 2011, which claims the benefit of Norwegian Patent Application No. 20101022 filed on Jul. 16, 2010. The entire disclosures of which are incorporated herein by reference.

THE TECHNICAL FIELD OF THE INVENTION

The present invention relates to a self lock mechanism which works like a break which is automatically turned off if the motor provide torque and rotate. It is automatically turned on again if the motor stops.

BACKGROUND OF THE INVENTION

Butterfly valves are a flat circular disk mounted inside a tube which can be rotated 90 degrees and thereby either allow or prevent fluid from flowing through a pipe. When the valve is nearly closed it can act as a throttle which limits the flow. There are other valves working in a similar way, but the butterfly valve is the most common choice for large valves used to control liquids flowing through pipes with diameter of more than 100 mm. Such type of valves may be rotated by mean a motor or by other types of actuators.

Electric actuators are one type of actuator used to rotate valves from closed to open position and any position in between, usually consisting of an electric motor combined with a gear so that the motor must rotate many times for the valve to rotate a quarter of a revolution.

It is preferable that the valve is unable to rotate the motor. This means that the valve should not move caused by the torque acting on the valve, like torque set up by the fluid flowing through the valve or torque caused by the valve sealing, even if the motor is turned off. For safety reasons it is usually best that the valve does not open or close if the electric power should disappear. Moreover, it is preferable not to have current flowing through the motor when it is standing still, something which would be necessary if the motor had to produce a torque to keep the valve in position. This may be achieved with a gear producing a considerably sized friction, or a friction break which the motor must overcome before it starts moving. Both solutions mean that the motor must be larger than strictly necessary because it must produce enough torque to overcome the break, in addition to the torque necessary to move the valve. It is also power inefficient and the friction will cause a lot of wear.

The present invention is motivated by a product made by Ringspann GmbH. A classic application of RINGSPANN™ irreversible locks is for the automatic locking of adjusting mechanisms. For such use the lock is seldom rotated more than a few revolutions and it is preferable that a considerable torque must be applied for the adjustment. An irreversible locks of this type have been attempted used between the gear and the motor in a butterfly valve actuator where the number of revolutions can be several hundred. Such irreversible locks will, however, create a lot of unnecessary friction, increasing the required size of the actuator motor and creating heat and wear which can cause problems.

Hence, there is a need for a mechanism preferably preventing the valve from rotating the motor. This means that the valve should not be move by a torque produced by the valve, such as a torque set up by the fluid flowing through the valve or torque caused by the valves sealing, even if the motor is turned off.

For safety reasons it is usually also a need for a mechanism preventing the valve from becoming open or closed, if the electric power should disappear.

Also it is a need for a system where there is no current flowing through the motor when it is standing still, something which would otherwise would have been necessary if the motor had to produce torque to keep the valve in position.

It is also a need for having a self lock mechanism preventing the valve from moving unless it is subjected to torque from the motor. For practical purposes this is a break which is turned off when the motor is turned on.

A further need is to have a self lock mechanism which is purely mechanical and that is activated and deactivated by the motor. It must also be very reliable.

SUMMARY OF THE INVENTION

An object of the present invention is to provide an improved self lock mechanism preventing the valve from moving unless it is subjected to a torque produced by the motor. For practical purposes the invention relates to a break which is turned off when the motor is turned on.

Another object of the present invention is to provide an improved self lock mechanism which is purely mechanical and that it is activated and deactivated by the motor.

Yet another object of the present invention is to provide an improved self lock mechanism that is very reliable.

A still further object of the present invention is to provide an improved self lock mechanism working like a break which is automatically turned off if the motor provides torque and rotate, and which is automatically turned off again if the motor stops.

Yet another object of the invention is to provide an improved self lock mechanism which prevents the valve from rotating the motor, i.e. being able to withstand torque imposed by the valve or its sealing contact, on the motor even when the motor power supply is cut off.

Another object of the invention is to provide a self lock mechanism preventing the valve from becoming open or closed, if the electric power should disappear.

A further object of the invention is to provide self lock mechanism and system where there is no need for current to flow through the motor when it is standing still, and still maintaining the valve in the required position.

The above objects are achieved by a self lock mechanism as further defined by the independent claims, while options, embodiments and alternatives of the self lock mechanism are defined by the dependent claims.

According to one embodiment of the present invention, a self lock mechanism for rotating actuators is provided, allowing rotation from one side while denying rotation from the other side, the mechanism comprising of one or more sets of rollers preferably separated by a spring and arranged between a housing and a valve connection part with a shape which will press one of the rollers in each set against the wall of the housing and causing a locking effect if the mechanism is attempted to be twisted from the valve side, and a motor connection part shaped so that it will press the rollers out of locking position and release the locking effect before the motor connection part makes contact with the valve connection part and start transferring torque. According to the invention, a spring between the rollers may be provided, having a stiffness and a length so as to provides a force which is sufficient for keeping the rollers in position but not sufficient to cause considerable friction between the rollers and a housing, thereby allowing the motor to rotate the gear trough the self lock mechanism with relatively small torque and power losses in the self lock mechanism.

According to another embodiment of the invention, the self lock mechanism for rotating the actuators is provided, allowing rotation from one side while denying rotation from the other side, the mechanism comprising sets of rollers arranged between a housing and a valve connection part with a shape which will press one of the rollers in each set against the wall of the housing, causing locking if the mechanism is attempted to be twisted from the valve side and a motor connection part shaped so that it will press the rollers out of locking position and against the valve connection part, transferring torque through the roller. According to this embodiment, the rollers are separated and kept in place by at least one wing on the valve connection part instead of a spring.

According to a further embodiment, a pin on the motor connection part, which press the roller out of locking position, may also press the roller against the wing, transferring torque through the mechanism and thereby render the torque transfer pins superfluous.

According to a further embodiment of the invention, the wings may be given a kind of triangular shape where the sides in the "triangle" is not necessarily straight lines and where one of the tips in the triangle is fastened to the valve connection part while one side follows the inside of the housing, preventing the roller from getting in contact with the wall of the housing when the release pin is pressing the roller against the wing.

The mechanism may be provided with two or more sets of rollers, release pins and lock surfaces on the valve connection part, wherein the sets are arranged in such relation to each other that forces from locking effect balance each other and thereby reduce wear on the bearings and make the mechanism easier to rotate from the motor side.

SHORT DESCRIPTION OF THE DRAWINGS

One embodiment of the invention shall be described below, referring to the accompanying drawings, where:

FIGS. 1a and 1b show the various parts forming the embodiment of the self lock mechanism, seen in an exploded view, where FIG. 1a shows a side view, while FIG. 1b shows a vertical section seen along the lines 2-2 in FIG. 2a;

FIG. 2b shows a vertical section through the embodiment shown in FIGS. 1a and 1b in an assembled state, seen along the lines 2-2 in FIG. 2a;

DETAILED DESCRIPTION OF THE DRAWINGS

In the following, the various embodiments of the invention will be described in further details, using the same reference numbers for identical or similar parts throughout the description.

Moreover, it should be appreciated that the present invention relates in general to a self lock mechanism 100, configured to be positioned between an actuating means (not shown), such as for example an electric motor, and a means to be actuated (not shown), such as a butterfly valve, positioned in a pipeline wherein a fluid may flow. Further, the required gear to be arranged between the actuating means and the means to be actuated is not shown.

Figure 1A:
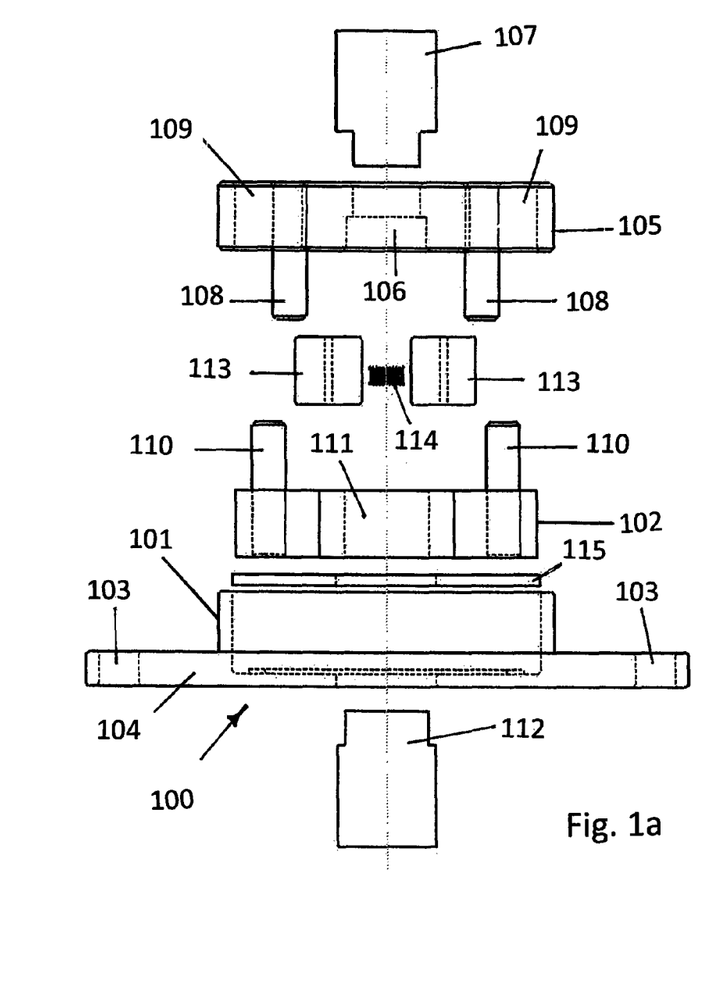
Figure 1B:
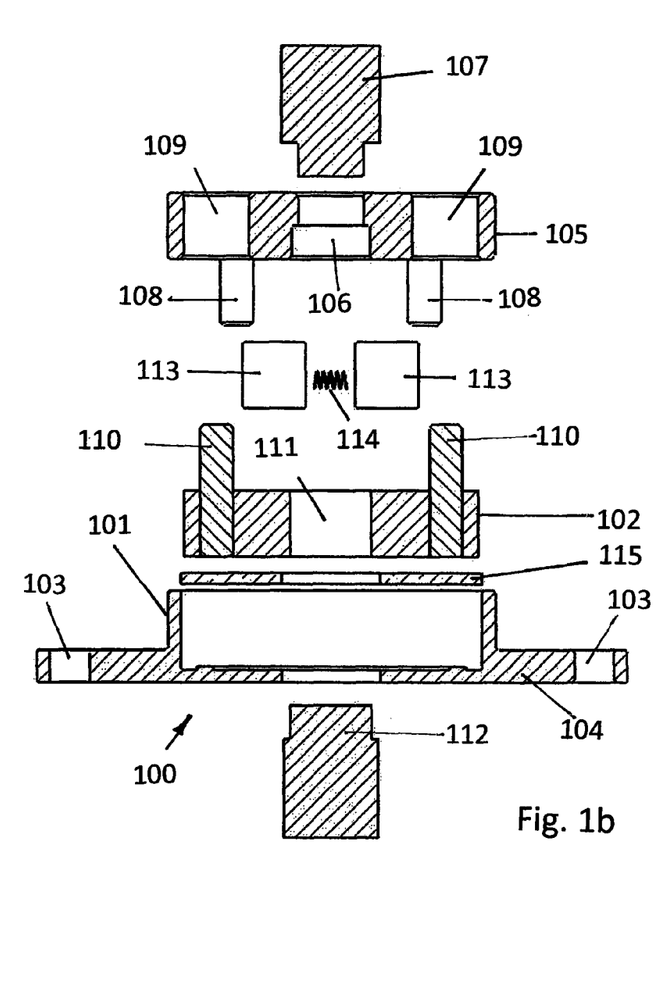
Figure 2A:
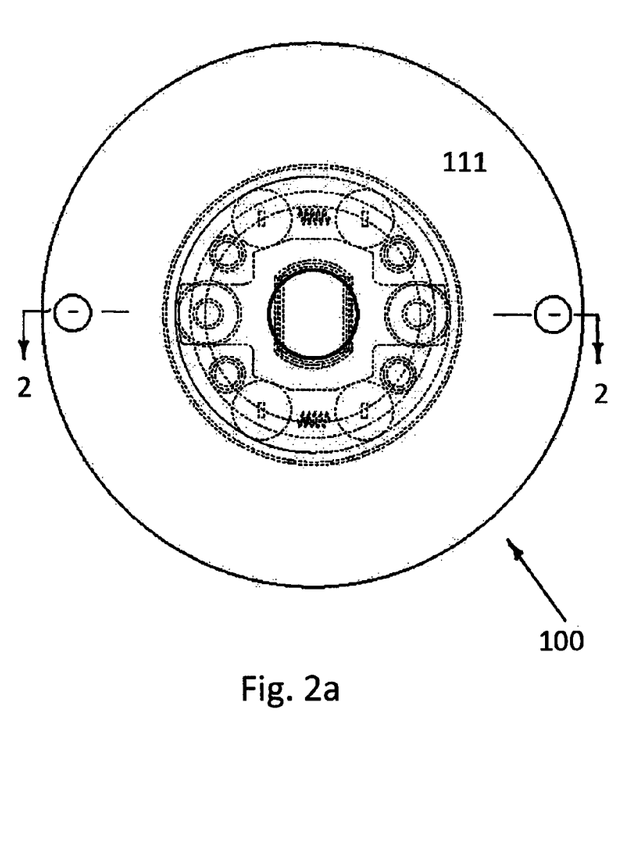
FIG. 2a shows schematically a top view of the embodiment shown in FIGS. 1a and 1b.
Figure 2B:
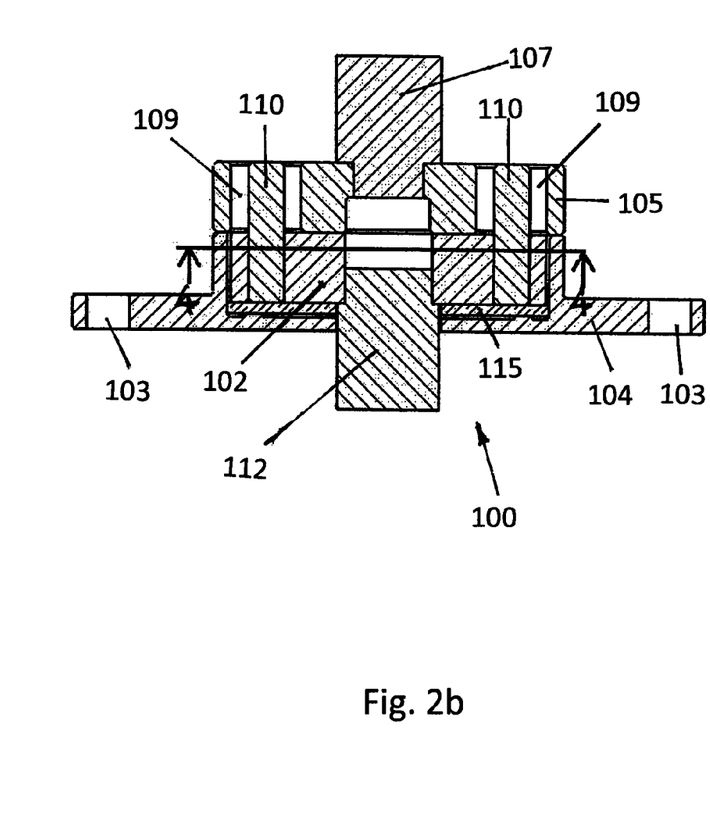
Figure 3:
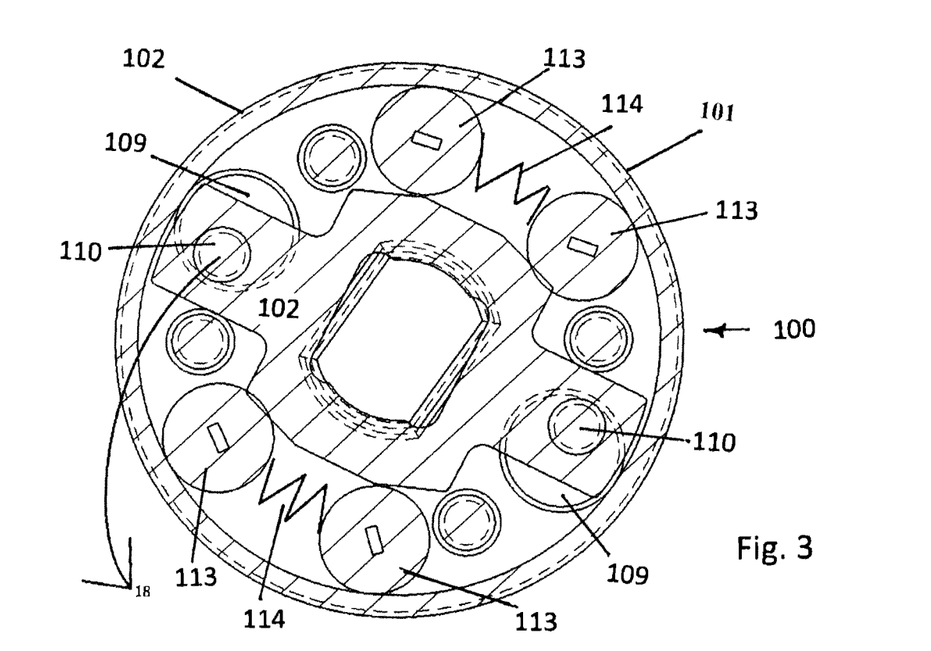
FIG. 3 shows schematically a horizontal cross section through the self lock mechanism shown in FIGS. 1a and 1b, seen from below, with no motor torque and the self lock mechanism being locked.
Figure 4:
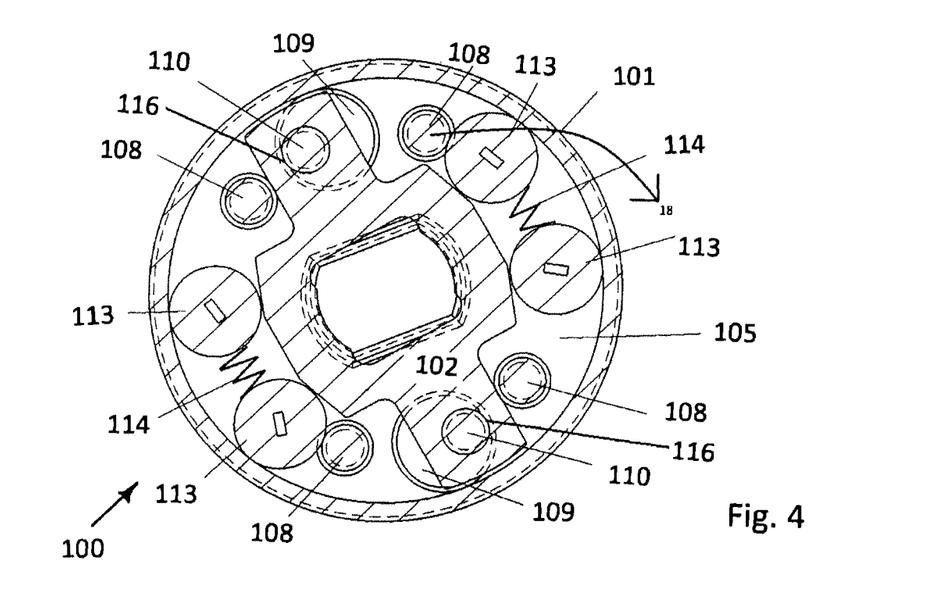
FIG. 4 shows schematically a horizontal cross section through the self lock mechanism shown in FIGS. 1a and 1b, the mechanism being seen from below, with the motor providing torque and with the self lock mechanism rotating.

According to the embodiment shown in FIGS. 1a and 1b, and also referring to FIGS. 2 to 4, the self lock mechanism 100 comprises a housing 101 containing the various elements of the self lock mechanism 100. The housing 101 is fastened with bolts through bolt holes 103 to a frame (not shown) of an actuator (not shown) in order to prevent it from moving or rotating. The bolt holes 103 are arranged in a flange 104 forming an integrated part of the housing 101.

The self lock mechanism 100 also comprises a motor shaft connector 105 having a centrally arranged hole 106, configured to receive the motor shaft 107. Both the centrally arranged hole 106 and the corresponding part of the motor shaft 107 are shaped so as to secure proper rotation of the motor shaft connector 105, without the risk of slipping or failing. Such shaping is well known to the person skilled in the art and will not be described in further detail. The motor shaft connector 105 is on the side facing downwards on the Figure provided with a number of downwards projecting release pins 108, rigidly fixed to the motor shaft connector 105. Further, the motor shaft connector 105 is also provided with a number of holes 109, each being configured to receive a corresponding torque transfer pin 110. The torque transfer pins 110 are rigidly attached to the valve connector 102. The dimensions and the shape of the valve connector 102 are configured so as to fit into the central space of the housing 101, enabling the valve connector 102 to rotate with respect to the inner wall surface of the housing 101. The valve connector 102 and the corresponding end flange 104 are provided with a centrally arranged, aligned hole 111, configured to receive the end of the shaft 112 connecting the valve gear (not shown) and the valve connection 102. Both the shafts 107 and 112 are fixed to the motor shaft connector 105 and the valve connection 102 in a manner securing the required torque transfer between the various parts. Such shaping is well known for the person skilled in the art and will not be described in further detail. Further, according to the embodiment shown in the FIGS. 1 to 4, the self lock mechanism 100 is provided with two pairs of rollers 113 and an intermediately arranged spring 114.

A slide bearing disk 115 having a centrally arranged hole for receipt of the valve gear connector shaft 112 is arranged to be placed at the bottom of the boring of the valve connector 102, configured to reduce the friction with respect to the housing 101 during rotation of the valve connector 102.

FIGS. 1a and 1b shows the various parts forming the embodiment of the self lock mechanism 100, seen in an exploded view, where FIG. 1a shows a side view, while FIG. 1b shows a vertical section seen along the lines 2-2 in FIG. 2a. FIG. 2a shows schematically a top view of the embodiment shown in FIGS. 1a and 1b; and FIG. 2b shows a vertical section through the embodiment shown in an assembled state, seen along the lines 2-2 in FIG. 2a.

FIG. 3 shows schematically a horizontal cross section through the self lock mechanism 100 shown in FIGS. 1 and 1b, seen from below, with no motor torque and the self lock mechanism 100 being locked, while FIG. 4 shows schematically a horizontal cross section through the self lock mechanism 100 where the mechanism 100 is seen from below, with the motor providing torque and with the self lock mechanism 100 rotating.

The solution according to this embodiment will function as follows, indicating the following principles, referring in particular to FIGS. 3 and 4:

FIG. 3 show the mechanism lock when rotated from the valve side. Note how halves of the rollers 113 interfere with valve connection 102 which is connected to the gear shaft 112, to indicate large normal force which create friction and cause the mechanism to lock. Here the arrow indicating the direction of rotation, i.e. rotation in clockwise direction, starts in the part connected to the shaft 107 which provides the torque, i.e. in this case being the shaft from the gear/motor. The torque transfer pins are part of valve connection 102.

If valve connection 102 is rotated by the valve/gear as indicated in FIG. 3, i.e. the valve connection 102 is rotated in anticlockwise direction, it will press two of the four rollers 113 against the inner surface of the wall of the housing 101. The established friction between rollers 113, the inner wall surface of housing 101 and valve connection 102, will then cause the locking effect due to said frictional forces. If rotated in the opposite direction the two other rollers 113, i.e. the rollers 113 which were idle during rotation in the first direction, will cause the locking in the same manner as explained above. It should be appreciated that faces 119 (four, but only one is marked) on the valve connection 102 are essential for the self lock mechanism to function properly.

The faces 119 should be configured to have a shape relative to the inside diameter of the hosing 101 securing that the rollers 113 is pressed into frictional contact with the inner surface of the wall of the housing 101 when the valve connection 102 is twisted. This is visualized in FIG. 8.

Figure 8:
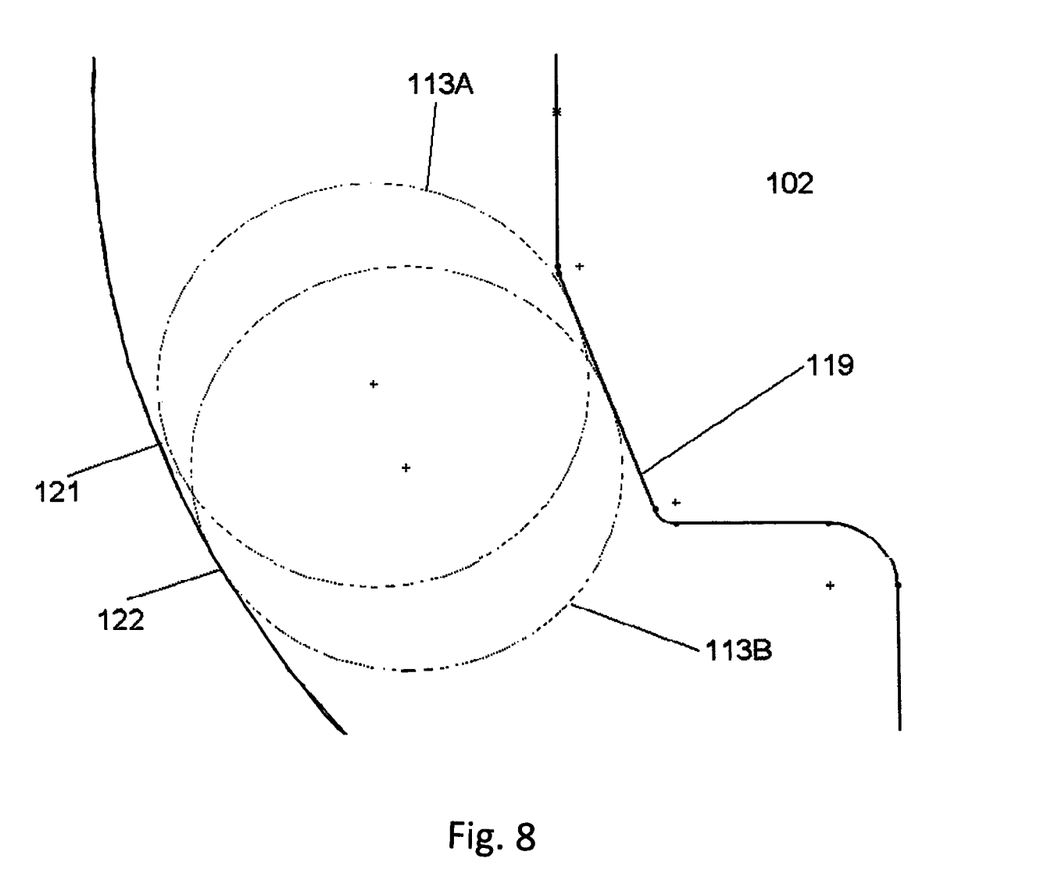
FIG. 8, shows schematically in an enlarge scale a portion of a part of the valve connection, a roller and the inner surface of the housing, indicating the position of the roller during a locking phase and a phase where the valve connection, and hence the valve, is allowed to rotate.

If the valve connection 102 in FIG. 8 is twisted in clockwise direction, the rollers 113 will move into position 113B, and because the roller 113 both press against the inside wall surface of the housing 101 and face 119 on the valve connection at contact point 122 they will cause the required locking effect. The only way the valve connection can be twisted clockwise is if the release pin 108 press the roller out of locking position 122, but that require torque from the motor.

If the valve connection 102 in FIG. 8 is twisted counterclockwise the rollers will move towards the position 113A, and because the roller 113 does not both press against the inside surface of the housing 101 and face 119 on the valve connection 102 it will not cause locking. Note the gap 121, allowing the motor to rotate the valve connection 102 and hence, the valve. The spring 114 (not shown in FIG. 8) or the wing 117 on the valve connection 102 (ref. the embodiment shown in FIG. 5a and 7) or similar devices, prevent the roller 113 from finding another position where it causes locking.

The face 119 can be straight, curved and possible have other shapes as long as the roller 113 moves into a position where it causes locking. If the lock release pins 108 press the rollers 113 into position 113A the torque transfer pins 110 will start pushing at valve connection 102 and start transferring torque.

The springs 114 between the two rollers 113 in a pair helps keeping the rollers 113 in position so that the mechanism locks immediately when rotation or twist is caused by rotation of the shaft 112 from the valve side. To avoid considerable friction losses when the mechanism is rotated or twisted from the motor side, it is important that the springs 114 have correct stiffness and length so as to provides just sufficient force to keep the rollers 113 in position, and not so much stiffness that there are large normal forces, and thereby much friction between rollers 113 and inner surface of the housing 101. This means that the springs 113 are compressed approximately the same distance as the radius of one roller 113 in a pair when mounted. A force equal the weight of the entire mechanism (if made of steel and with similar ratio as shown on the Figures) will cause a compression of the spring of more than 5% of the total uncompressed length of each spring 114. This paragraph is included to give an impression of how each spring 114 must be designed to give a force which is just sufficient to hold the rollers in position without causing a lot of friction, which is essential for the first patent claim. There are many variations of spring stiffness and length which will work.

FIG. 4 shows how the motor can rotate the gear through the self lock mechanism 100. Note how the release pins 108 press on the rollers 113 so there is no contact between valve connection 102 and the rollers 113. In operation there is contact because the springs 114 press the rollers 113 to the position where the rollers 113 cause instant locking if the motor torque disappears, but there is no large contact force whereby the self lock mechanism is allowed to rotate. The arrow, which indicates direction of rotation, starts in one of the release pins 108 because it is this motor connection 105 which gets the torque from the motor first.

When the mechanism is twisted from the motor side, ref. FIG. 4, it is the spring which pushes the roller which is not in contact with the release pins 108 whereby the rollers 113 stay in position. Without the spring 114 there is considerable movement before the mechanism lock when twisted from the gear side. It would also be possible to make the mechanism rotate from the gear side if the rotation direction is shifted for a short span every time the rollers 114 lock, caused for example by vibrations.

A single set of rollers 113 would be sufficient to create locking, but it would set up unbalanced or biased forces in the bearing. For a large torque system like a valve actuator it is important to have symmetry in the self lock mechanism 100 both to get rid of forces in the bearing and to reduce friction and thereby losses in the mechanism.

If the motor shaft 107 is rotated, it will rotate the motor connection 105. Holes 109 in motor connection 105 allows motor connection 105 to be rotated some angle before torque transfer pins 110 of valve connection 102 make contact with the wall in hole 109. This is sufficient that release pins 108 of motor connection 105 can press the rollers 113 which otherwise would cause locking out of position before torque transfer pins 110 of valve connection 102 and holes 109 in motor connection 105 makes contact and start transferring torque from motor to gear and valve.

In FIG. 4 the contact point 116 (indicated by a thicker marking line to the reference number 116) between the hole 109 in motor connection 105 and the torque transfer pin 110 of valve connection 102. This contact point 116 is not in the plane of the cross section. It is the walls of the hole 109 in the motor connection 105 which moves the torque transfer pin 110 of the valve connection 102.

FIGS. 3 and 4 indicate large relative movement between the parts, but in the actual lock mechanism 100 the relative movement apart from rotation is not visible with the naked eye.

Figure 5A:
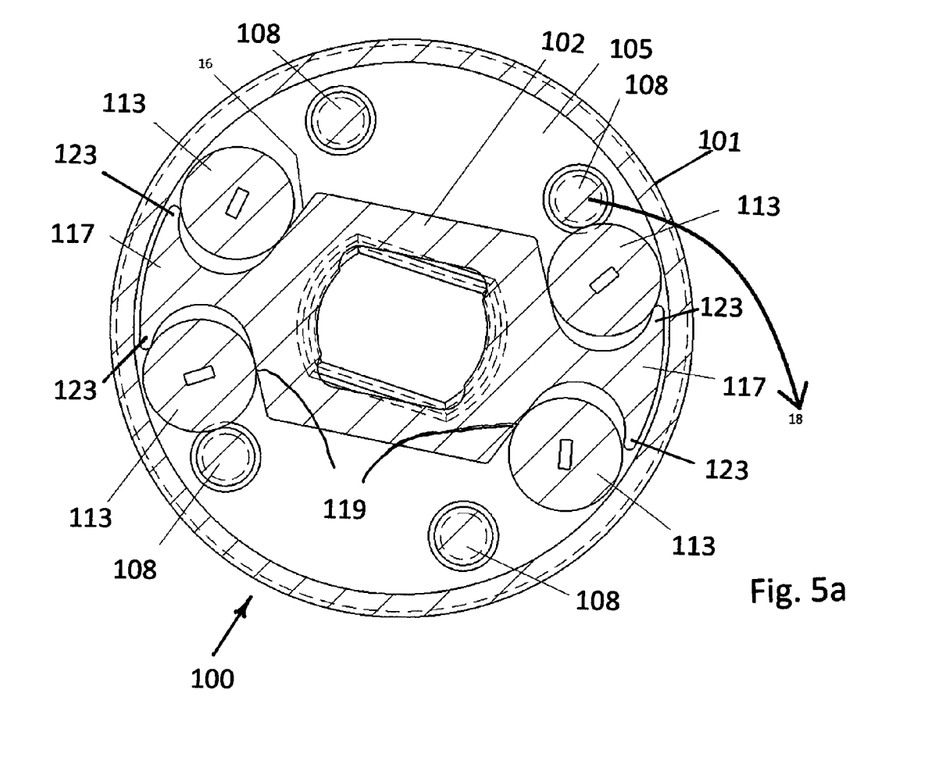
FIG. 5a shows schematically a horizontal cross section through another embodiment of a self lock mechanism, seen from below and along the lines C-C in FIG. 5b, where the motor is providing torque and where the self lock mechanism is rotating.
Figure 5B:
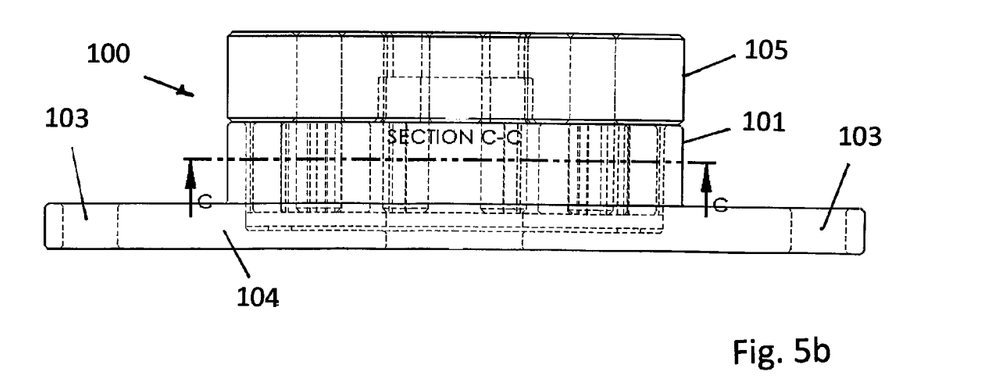
FIG. 5b shows a side view of the embodiment shown in FIG. 5a, indicating with dotted lines the various parts of the shown embodiment of the self lock mechanism.

FIGS. 5a and 5b show an alternative self lock mechanism 100 without a springs, but otherwise based on the same principles of construction and function. FIG. 6a shows schematically a horizontal cross section through another embodiment of a self lock mechanism 100, seen from below and along the lines C-C in FIG. 5b, the Figure showing a stage where the motor is providing torque and where the self lock mechanism 100 is rotating in clockwise direction; and FIG. 5b shows a side view of the embodiment shown in FIG. 5a, indicating with dotted lines the various parts of the shown embodiment of the self lock mechanism 100.

For the alternative self lock mechanism 100 the springs is replaced with a wing 117 confugured to separate the rollers 113 in the same way as the springs 114 according to FIGS. 1-4, but also to transfer torque. The wings 117 can form intergraded parts of valve connection 102 as shown in the Figure. In FIG. 5a the wings 117 are given a shape which ensures that when the release pins 108 press on the rollers 113, the rollers 113 will not be in contact with the housing 101, i.e. the release pins 108 tend to press the rollers 113 inwards in direction towards the center of the housing 101. This is preferable because the rollers 101 then do not need to rub against the inner surface of the wall of the housing 101 or the release pin 108, but not strictly necessary because the rollers 113 in this situation will be in a space where no large forces are pressing the rollers 113 against the housing 101 wall. Hence, there will therefore be only a little friction in any case. When valve connection 102 is rotated from the valve side, the small friction between the rollers 113 bottom and the inside surface of housing 101 will be sufficient to secure that halves of the rollers 113 move to a position providing the locking effect.

The advantage of the alternative self lock mechanism 100 is less friction. The disadvantage is that complete locking may not be archived if the valve is subjected to vibration.

The shape of the wings 117 can be optimized so that the rollers 113 provide quick locking. To archive this the tolerances must be correct and the wings 117 must have a shape which prevent the rollers 113 from getting stuck. As shown in FIG. 5a, each wing 117 is provided with a surface 119 forcing the rollers 113 into frictional, and hence locking contact with the inner surface of the housing 101. In addition each wing 117 is provided with a tip 123 at each extreme end of the wings 117, the tips 123 securing that the rollers 113 are prevented from being in contact with the inner surface of the housing 101 when the motor is rotating the valve connection 102, thus elimination, or at least substantially reducing. the friction between the rollers 113 and said inner surface of the housing 101. In between the surface 119 and the tip 123, each side of the wings is provided with an indent, the shape of which more or less corresponds to the shape of the rollers 113. During the initial contact between the rollers 113 and each corresponding tip when rotating in a clockwise direction, the rollers 113 will be forced slightly away from the inner surface of the housing 101.

According to this embodiment, the torque transfer pins 110 of the valve connector 102 and the corresponding holes 109 in the motor shaft connector 105 is removed, as such part does not have any function.

Figure 6:
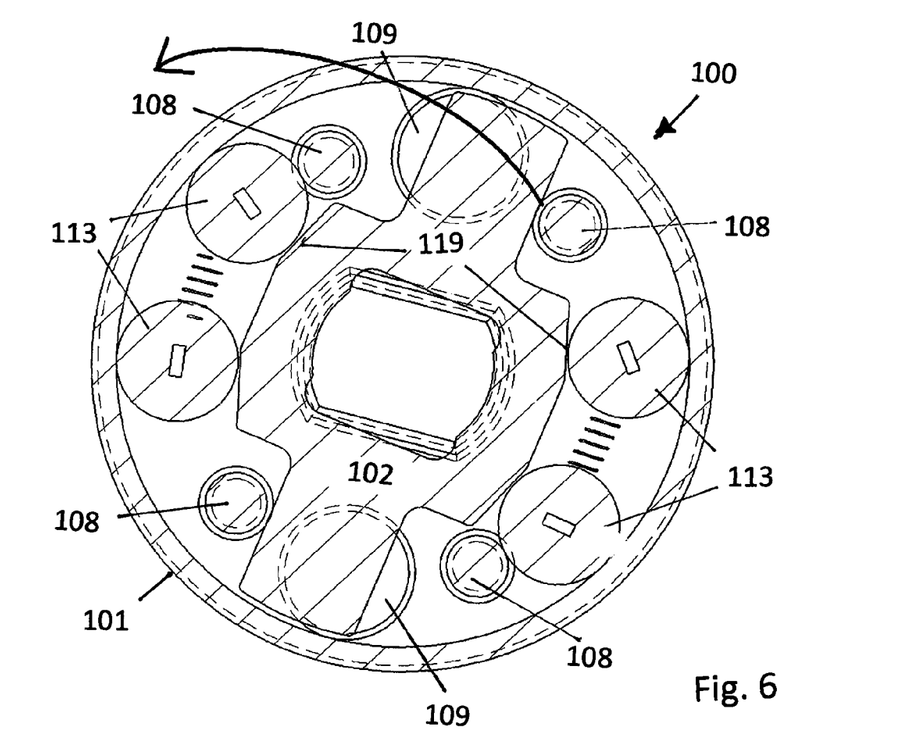
FIG. 6 shows schematically a variant of the embodiment of the self lock mechanism shown in FIGS. 1-4.

FIG. 6 shows schematically a variant of the embodiment of the self lock mechanism 100 shown in FIGS. 1-4. According to this embodiment the torque transfer pins 110 (not shown in FIG. 6) fixed to the valve connector 102 and the corresponding holes 109 in the motor shaft connector 109 have no function and thus are omitted since their functions are achieved by means of the release pins 108. The pair of release pins 108 which does not press against the rollers 113 will press against the valve connector 102 and render the torque transfer pins 110 and the holes 109 in the motor shaft connector 105 superfluous. The holes 109 is still present in the Figure, but has no function. The pins 110 are removed. According to this embodiment the rollers 113 and the valve connector 102 are resized and only two release pins 108 are used. The springs used in the embodiment shown in FIG. 1-4 are now replaced by flexible rubber cylinders 118 securing a quicker and more reliable self locking effect by providing a force which presses the rollers 113 out of their slots in valve connector 102. The rubber cylinders 118 are positioned in a recess or slot provided in the deepest end of said slots in the valve connector 102 for the rollers 113. When rotating anticlockwise, i.e. the valve connector 102 is rotated by the valve/gear, contact points 119 between each roller 113 and a corresponding part of the slot for each roller are established, pressing the rollers into locking contact with the inner surface of the housing 101. Such locking contact points will be at a part of the recess for the rollers 113, near the axis of rotation of the valve connector 102. If the unit is rotated from the motor side, the valve connector 102 will be rotated in a clockwise direction, establishing contacts points 120 close to the inner wall of the housing 101, forcing the rollers 113 slightly inwards towards the axis of rotation, away from the locking contact with the inner surface of the housing 101.

Figure 7:
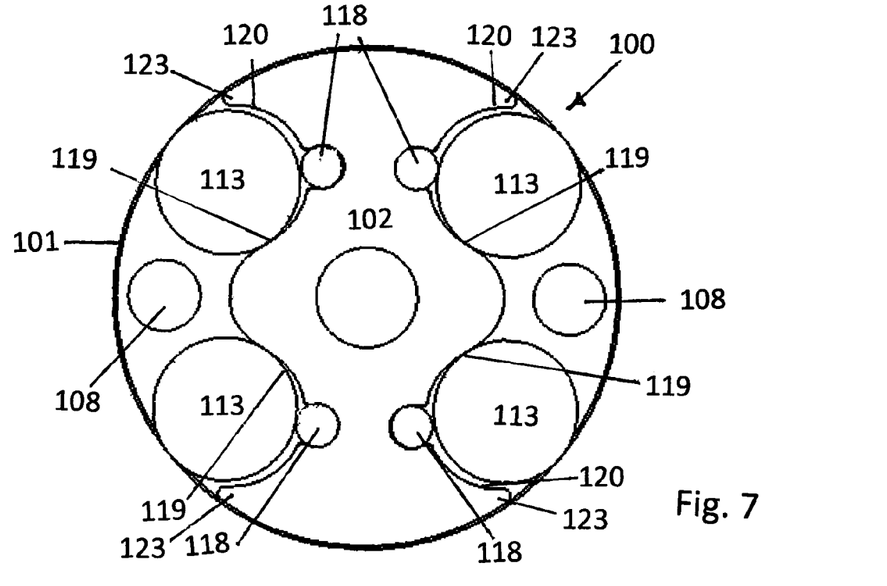
FIG. 7 shows schematically a cross section through a further variant of a self lock mechanism according to the present invention, using flexible rubber cylinders as spring for the rollers.

It should be appreciated the surfaces 119 are shaped, configured and functioning in the same way as described above both for the embodiment shown in FIG. 5a and FIG. 7. Also the wings 117 of the embodiment shown in FIG. 7 are provided with tips 123 as described above.

According to the invention, friction is drastically reduced by making the mechanism symmetric and by adjusting the spring stiffness to a minimum.

Alternatively the spring can be omitted. This makes the mechanism more suited to be used in an application where considerable power is to be transferred through the mechanism.

As indicated in the Figures, the rollers 113, release pins 108 and the torque transfer pins 110 and the corresponding openings or holes for said units have a cylindrical shape with a circular cross sectional area.

It should be noted that the motor shaft 107 and the valve gear shaft 112 will usually be part of the motor and the valve gear, and are only shown here to help explain functionality of the self lock mechanism 100. Holes 106 and 111 in respectively motor connection 105 and valve connection 102 will have to be manufactured after the shaft specifications.

Further, the motor and the valve are not shown. It should be appreciated that the assembled system will be provided bearings (not shown, of a suitable type, such as roller bearings. The configuration o and positioning of such bearings is well known to the person skilled in the art and will not be described in any further detail. It should be noted that the bearing will only rotates a few degrees before the self lock starts to rotate, so that a roller bearing is not strictly necessary.

The invention claimed is:

1. A self lock mechanism for rotating actuators, allowing rotation from one side while denying rotation from the other side, comprising:

a housing;

a valve connection part;

sets of rollers arranged between the housing and the valve connection part with a shape which will press one of the rollers in each set against a wall of the housing and cause locking if the mechanism is attempted to be twisted from the valve side;

a motor connection part shaped to press the rollers out of locking position and against the valve connection part and to transfer torque through the rollers, wherein the rollers are separated and kept in place by a wing on the valve connection part without a spring; and release pins on the motor connection part which press the rollers out of locking position, wherein the wing has a substantially triangular shape where the sides in the triangle are not necessarily straight lines and where one of tips in the triangle is fastened to the valve connection part while one side of the triangle follows the inside of the housing, which prevents the roller from contacting the housing wall when the release pins press the rollers against the wing.

2. Self lock mechanism for rotating actuators according to claim 1, where there are two or more sets of rollers, release pins and lock surfaces on the valve connection part, wherein the sets are arranged so relative to each other so forces from locking balance each other and thereby reduce wear on the bearings and make the mechanism easier to rotate from the motor side.

\* \* \* \* \*